United States Patent [19]
Tominaga et al.

[11] 4,198,141
[45] Apr. 15, 1980

[54] OUT-OF-RANGE INDICATION DEVICE FOR AUTOMATIC DIAPHRAGM CONTROL

[75] Inventors: Shinji Tominaga, Sakai; Hiroshi Ueda, Nara, both of Japan

[73] Assignee: Minolta Camera Kabushiki Kaisha, Osaka, Japan

[21] Appl. No.: 923,228

[22] Filed: Jul. 10, 1978

[30] Foreign Application Priority Data

Aug. 5, 1977 [JP] Japan ............................. 52/94299
Sep. 12, 1977 [JP] Japan ............................. 52/110342

[51] Int. Cl.² .................... G03B 7/20; G03B 17/18
[52] U.S. Cl. ............................... 354/46; 354/60 L; 340/600
[58] Field of Search ............. 354/23 D, 46, 53, 57, 354/60 L, 60 E, 273, 289; 356/226; 340/600, 662, 663; 250/214 P; 324/96, 110, 122

[56] References Cited

U.S. PATENT DOCUMENTS

| Re. 29,615 | 4/1978 | Toyoda | 354/60 E |
|---|---|---|---|
| 3,024,388 | 3/1962 | Blitchington, Jr. | 324/110 |
| 3,078,772 | 2/1963 | Goshima | 354/38 X |
| 4,104,655 | 8/1978 | Strauss | 354/60 L X |
| 4,107,708 | 8/1978 | Saito et al. | 354/60 L |
| 4,118,726 | 10/1978 | Kuramoto et al. | 354/60 L X |

FOREIGN PATENT DOCUMENTS 1258260  1/1968  Fed. Rep. of Germany ............ 354/30

*Primary Examiner*—L. T. Hix
*Assistant Examiner*—William B. Perkey
*Attorney, Agent, or Firm*—Watson, Cole, Grindle & Watson

[57] ABSTRACT

An indicating system for indicating a diaphragm aperture suitable for scene brightness and set exposure factors, includes a pair of out-of-range indicating means for making an indication when the suitable diaphragm aperture is outside an available diaphragm range on either side of a full open and minimum aperture. The system further includes an interruption means for disabling indication of the diaphragm aperture when either of the pair of out-of-range indicating means is in operation or when the diaphragm aperture setting member is not set to the minimum diaphragm position. When an interchangeable lens, which is not adapted for the diaphragm aperture indication, is associated with the indicating system, the interruption means may also disable the diaphragm aperture indication.

10 Claims, 11 Drawing Figures

OUT-OF-RANGE INDICATION DEVICE FOR AUTOMATIC DIAPHRAGM CONTROL

BACKGROUND OF THE INVENTION

1. Field of the Invention

The present invention relates to an exposure indication system for interchangeable lens cameras, and more particularly pertains to such an indicating system which indicates a diaphragm aperture suitable for scene brightness and set exposure factors such as shutter speed and film sensitivity.

2. Description of the Prior Art

Indicating systems are known which indicate not only a diaphragm aperture suitable for scene brightness and set exposure factors, but also whether the suitable diaphragm aperture is within or outside a diaphragm aperture range available for the interchangeable lens mounted on the camera in which the indicating system is employed. (see, for example, U.S. Pat. No. 4,087,829). However, the known systems provide an indication of the diaphragm aperture that is outside the diaphragm range available for the interchangeable lens, along with the indication that the diaphragm aperture indicated is outside the range, when the diaphragm aperture to be indicated is outside the range but within the indicatable range. For, example, for an interchangeable lens having a diaphragm aperture range from F 2.8 to F 16 associated with a diaphragm indicating system capable of indicating from F 1.4 to F 32, indication of F 2 as well as out-of-range indication will be made when the suitable aperture is F 22. These double indications are likely to cause confusion to the user. In case the diaphragm indicating system is associated with an automatic diaphragm control divice to indicate an automatically controlled diaphragm, the camera operator might understand from the indication that the diaphragm will be determined to the indicated aperture which, in fact, is not available for the interchangeable lens.

SUMMARY OF THE INVENTION

Accordingly, the general object of the present invention is to provide an improved diaphragm aperture indicating system for a camera adapted to be selectively coupled with interchangeable lenses having various diaphragm aperture ranges.

A more specific object of the present invention is to provide a diaphragm aperture indicating system which is free from the above mentioned double indication.

Another specific object of the present invention is to provide a diaphragm aperture indicating system wherein diaphragm aperture indication is prevented when the diaphragm aperture to be indicated as a suitable aperture for measured scene brightness and set exposure factors is outside a diaphragm range available for an interchangeable lens associated with the indicating device.

To attain these objects, a diaphragm aperture indicating system according to the present invention comprises a first and a second indicating member, a first actuating means for generating an output to actuate the first indicating member when a measured scene brightness and a set exposure factor are expected to cooperatively provide a diaphragm aperture that exceeds one of the limits of a diaphragm range available for an interchangeable lens associated with the indicating device, a second actuating means for generating an output to actuate the second indicating member when the expected diaphragm aperture exceeds the other limit of the available range, and means responsive to the outputs of the first and second actuating means for preventing diaphragm aperture indication when either of the first and second actuating means generates an output.

According to one embodiment of the present invention, the diaphragm indicating system comprises a first means for generating a first signal commensurate with a set shutter speed, a second means for generating a second signal representative of a shutter speed suitable for measured scene light, full open aperture of the interchangeable lens, and preferably a set film sensitivity, a third signal having a level obtained by shifting the level of the second signal by an amount corresponding to a number of steps from the full open to the minimum diaphragm aperture of the lens, first comparison means for comparing the first and second signals to generate an output when the shutter speed corresponding to the second signal is lower than that corresponding to the first signal, second comparison means for comparing the first and the third signals when the shutter speed corresponding to the third signal is higher than that corresponding to the first signal, a diaphragm indication means for indicating a diaphragm aperture suitable for the set shutter speed, measured scene light and preferably the set film sensitivity, a first out-of-range indicating means responsive to the output of the first comparison means, a second out-of-range indicating means responsive to the output of the second comparison means, and means for deactuating the diaphragm indication means when either of the first or second means generates the signal.

In the above mentioned system, the second means may be a light measuring circuit including a photocell which receives scene light through the full open diaphragm aperture so that the full open aperture may be taken into account in the second signal. In this case the diaphragm aperture indication means may be responsive to the first signal and a signal having a level obtained by shifting the level of the second signal by an amount commensurate with the full open diaphragm aperture.

Further, there is proposed a diaphragm aperture indication system in which an interchangeable lens has a first and a second signal transmitting member, the first member transmitting a signal commensurate with the number of steps from full open to a selected or preset aperture, while the second member transmits a signal commensurate with the minimum diaphragm aperture when the minimum aperture is selected or a diaphragm setting member is set to the minimum aperture position, whereby the combination of the signals transmitted through the first and second signal transmitting members provides information of full open diaphragm aperture of the lens. (see U.S. patent applications Nos. 813,657 and 763,680 both having been allowed). This indication system can provide proper diaphragm indication only when a diaphragm setting device is set to the minimum diaphragm aperture position. Of course, if an interchangeable lens having only the first signal transmitting member is associated with such system, proper indication of the diaphragm aperture can not be expected because of lack of information of the full open aperture. Thus, according to one feature of a preferred embodiment of the present invention, means are provided for disabling the diaphragm aperture indication when an interchangeable lens coupled with the system does not have the second signal transmitting member, or when the diaphragm setting member of an interchangeable lens having both the first and second signal transmitting member is set to a position other than the minimum aperture position.

The above and other related objects and features of the invention will be apparent from a reading of the following description of the disclosure found in the accompanying drawings.

DESCRIPTION OF THE PREFERRED EMBODIMENTS

Figure 1:
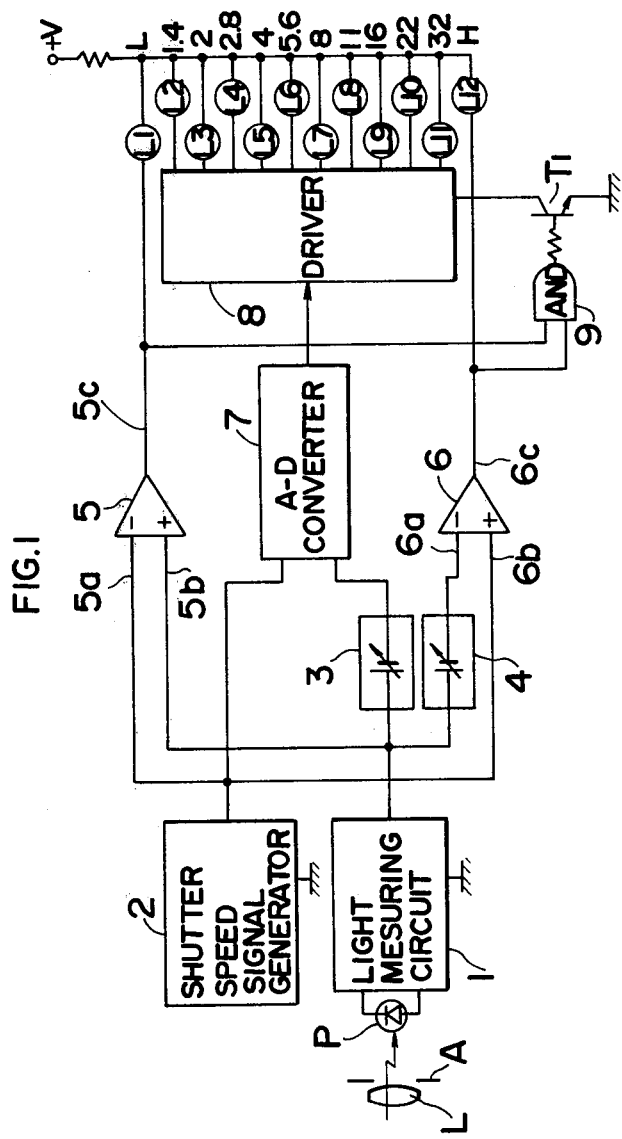
FIG. 1 is a schematic circuit diagram of one embodiment of the present invention.

FIG. 1 is a block diagram of the basic construction of a digital diaphragm aperture indicating system according to the present invention. The shown circuits being mounted inside a camera body. Referring to FIG. 1, light measuring circuit 1 measures, with its photocell P, intensity of a scene light introduced through camera objective L and diaphragm aperture A, to produce a voltage signal representative of a suitable exposure time as a result of an exposure calculation with the measured light intensity and film sensitivity. As the light measurement is carried out with the diaphragm aperture of a camera lens at use, fully open the output of the light measuring circuit represents a suitable exposure time at the full open diaphragm aperture value.

Shutter speed signal generating circuit 2 (hereinafter referred to as speed signal circuit) generates a voltage signal in accordance with a shutter speed manually set by a photographer. Both of the abovementioned circuits are constructed such that their output signals may be voltage signals having a linear relationship with exposure time value Tv as defined in the APEX system. First shift circuit 3 shifts the output of light measuring circuit 1 by a voltage corresponding to a full open diaphragm aperture value of the camera lens used. Second level shift circuit 4 shifts the output of light measuring circuit 1 by a voltage corresponding to the maximum steps of a diaphragm aperture, i.e. the number of steps counted when the diaphragm of the camera objective is stopped down from its full open to the minimum aperture. Comparison circuits 5 and 6 respectively compare the output of light measuring circuit 1 with that of speed signal circuit 2. Comparison circuit 5 generates a low level signal at its output terminal 5c when the voltage at input terminal 5a, i.e. output of speed signal circuit 2 is higher than the voltage at input terminal 5b, i.e. output of light measuring circuit 1, and a high level signal at output terminal 5c when the voltages at input terminals 5a and 5b are in the opposite relationship. Light measuring circuit 1 and speed signal circuit 2 are arranged such that the shorter the exposure time, the higher the output voltage. When the output of light measuring circuit 1 is lower than the output of speed signal circuit 2, means that the set shutter speed providing the output of speed signal circuit 2 is too fast, or that the measured light requires a diaphragm aperture larger than the full open aperture for the set shutter speed, since light measurement is performed with the diaphragm aperture fully open. Accordingly, the low level output of comparison circuit 5 is a signal indicating that the diaphragm aperture required as a function of set shutter speed and measured light is not within an available aperture range to the camera lens and is larger than the full open aperture. Similarly, a low level output of comparison circuit 6 is a signal indicating that a diaphragm aperture value required for the set shutter speed in conjunction with the measured light is not within the available range, and is smaller than the minimum diaphragm aperture of the camera lens used. That is, as the output of light measuring circuit 1 represents an exposure time value suitable for the full open diaphragm aperture in terms of measured light, and second level shift circuit 4 subtracts a voltage corresponding to the maximum number of steps of diaphragm aperture from the output of the light measuring circuit, the voltage applied to terminal 6a of comparison circuit 6 is a signal representative of an exposure time suitable for the minimum diaphragm aperture of the camera lens used. Comparison circuit 6 is so constructed that the voltage at output terminal 6c thereof will be low when the output voltage of speed signal circuit 2 (representing manually set shutter speed) applied to input terminal 6b is lower than the voltage applied to input terminal 6a, i.e. the above mentioned suitable exposure time signal (when the suitable exposure time is longer than the manually set shutter speed).

Due to the above-mentioned construction, a diaphragm aperture to be controlled is expected to be outside an available aperture range when the output of either comparison circuit 5 or comparison circuit 6 is low, but within the available aperture range when the outputs of both comparison circuits 5 and 6 are high. The outputs of comparison circuits 5 and 6 are applied to AND gate 9. When both outputs are high the output of AND gate 9 is made high to turn on transistor T1, thereby energizing driver 8 for a series of indicator lamps L2 through L11, so that a diaphragm aperture to be controlled is indicated with one of the lamps L2 through L11. When the output of either comparison circuit 5 or comparison circuit 6 becomes low, the output of AND gate 9 also becomes low to turn off transistor T1 and de-energize driver 8 thereby interupting the indication of the diaphragm aperture to be controlled. When the output of comparison circuit 5 is at a low level, lamp L1 is lit with current flowing from the positive side of a power source to the output terminal 5c of comparison circuit 5, thereby indicating that the diaphragm aperture required is larger than the available full open diaphragm aperture, and thus warning a photographer that the shutter speed be reset to a slower speed. Similarly, when the output of comparison circuit 6 is at a low level, lamp L12 is lit to warn that the diaphragm aperture required is less than the available minimum diaphragm aperture.

Although it is not the main subject of the present invention, an explanation is given of the diaphragm indicating system for indicating the diaphragm aperture to be controlled, by means of a series of lamps L2 through L11. The difference between the output levels of light measuring circuit 1 and speed signal circuit 2 corresponds to the steps of shutter speed between a shutter speed suitable for the full open diaphragm aperture and a set shutter speed. This difference also serves as a signal representative of the steps for the diaphragm to be stopped-down from the full open to the proper aperture. If the immediate AD conversion of this difference signal is applied to an input of driver 8 which decodes its input signal into a digital signal for lighting one of the lamps L2 through L11, such indication by a lamp is to indicate only the steps from the full open diaphragm aperture to the suitable aperture. However, what is desired to be indicated here is not the steps but the suitable diaphragm aperture value itself. To this end the difference between the output of speed signal circuit 2 and the signal from first shift circuit 3, wherein a full open diaphragm aperture of the camera lens is added to the output of light measuring circuit 1, is converted from an anologue to a digital signal by AD converter 7 and applied to driver 8. Each of the lamps L2 through L11 is now assumed to indicate the diaphragm aperture value shown by the numeral at the left of each lamp in the Figure. In the case of the present invention, the minimum diaphragm aperture value that can be indicated, is F1.4, and when an exchangeable lens having the full open diaphragm aperture of F2 is mounted, first shift circuit 3 generates a voltage corresponding to the difference of 1 step between F1.4 and F2, the voltage indicative of one step is added to the output of light measuring circuit 1. With the assumption that the difference in output between light measuring circuit 1 and speed signal circuit 2 is two steps, the lamp three steps (1+2 steps as mentioned above) down from lamp L2, lights up for indication.

The operation of the above-mentioned circuits are now explained by using exemplary numerals. Consideration is given to a case where a camera lens having a full open diaphragm aperture of F2, a minimum diaphragm aperture of F16 and 6 possible steps for stopping-down of the diaphragm is associated with the above explained indicating device. Assume that the shutter speed is set at 1/500 second, and that the light measuring circuit generates an output which corresponds to a shutter speed of 1/250 second. Since the suitable exposure time for the full open diaphragm aperture of F2 is 1/250 second, the suitable diaphragm aperture for a shutter speed of 1/500 second has to be F1.4 which is beyond the available aperture range. Actually, in this case, the output voltage of speed signal circuit 2 is higher than that of light measuring circuit 1, and accordingly the output of comparison circuit 5 is at a low level, so that driver 8 remains inoperative with lamp L1 lighting to warn that the diaphragm aperture to be controlled is out of the available range in the side of the full open aperture. Next, with the same lens used, the shutter speed is set at 1/250 second, and the light measuring circuit generates an output corresponding to 1/2000 second. Then the difference in shutter speed is three steps, and a diaphragm aperture of F5.6, 3 steps down from F2, for providing a suitable exposure is within the available aperture range. At this time, since the output of light measuring circuit 1 is higher than that of speed signal circuit 2, the output of comparison circuit 5 is at a high level, so that lamp L1 does not light. The voltage at input terminal 6a of comparison circuit 6 is lower than the output of light measuring circuit 1 by a voltage corresponding to the difference of six steps between the full aperture of F2 and the minimum diaphragm aperture of F16. This input voltage is lower than the output of speed signal circuit 2 which is still lower by three steps than the output of light measuring circuit 1, so that the output of comparison circuit 6 to be at a high level. Consequently lamp L12 does not light, allowing driver 8 to operate for the indication of the diaphragm aperture to be controlled. This indication is made with lamp L6, at four steps down from lamp L2, indicating F5.6 as the suitable aperture. This four steps corresponds to the difference between the voltage corresponding to 1/250 second in speed signal circuit 2 and the voltage obtained by the subtraction of the voltage, corresponding to the difference of one step between the minimum diaphragm aperture value of F1.4 and the full open diaphragm aperture of F2 of the mounted lens, from the output of light measuring circuit 1, i.e. the voltage corresponding to 1/4000 second. Finally, consideration is given to a case where light measuring circuit 1 generates an output corresponding to a shutter speed of 1/4000 second, for a set shutter speed of 1/30 second with the same lens as in the above case being used. At this time, the difference of the shutter speeds is seven steps and stopping down seven steps from F2 requires F22 which is beyond the available diaphragm aperture range on the side of minimum aperture, because the minimum aperture of the lens used is F16. In this case, the voltage at input terminal 6a of comparison circuit 6 has a value provided by second level shift circuit 4 as a result of a substraction, from the output of light measuring circuit 1 (the output corresponding to 1/4000 second) of a voltage corresponding to the maximum steps that can be stopped-down from the full open diaphragm aperture (in the present case six steps from F2 to F16). This value corresponds to a shutter speed of 1/60 second, and is higher than the value of the output of speed signal circuit 2 which corresponds to 1/30 second, so that the output of comparison circuit 6 is at low level to light lamp L12 warning that the required diaphragm aperture is not within the available aperture range. At this time, transistor T1 is turned off, causing no indication of a diaphragm aperture to be controlled.

Figure 2:
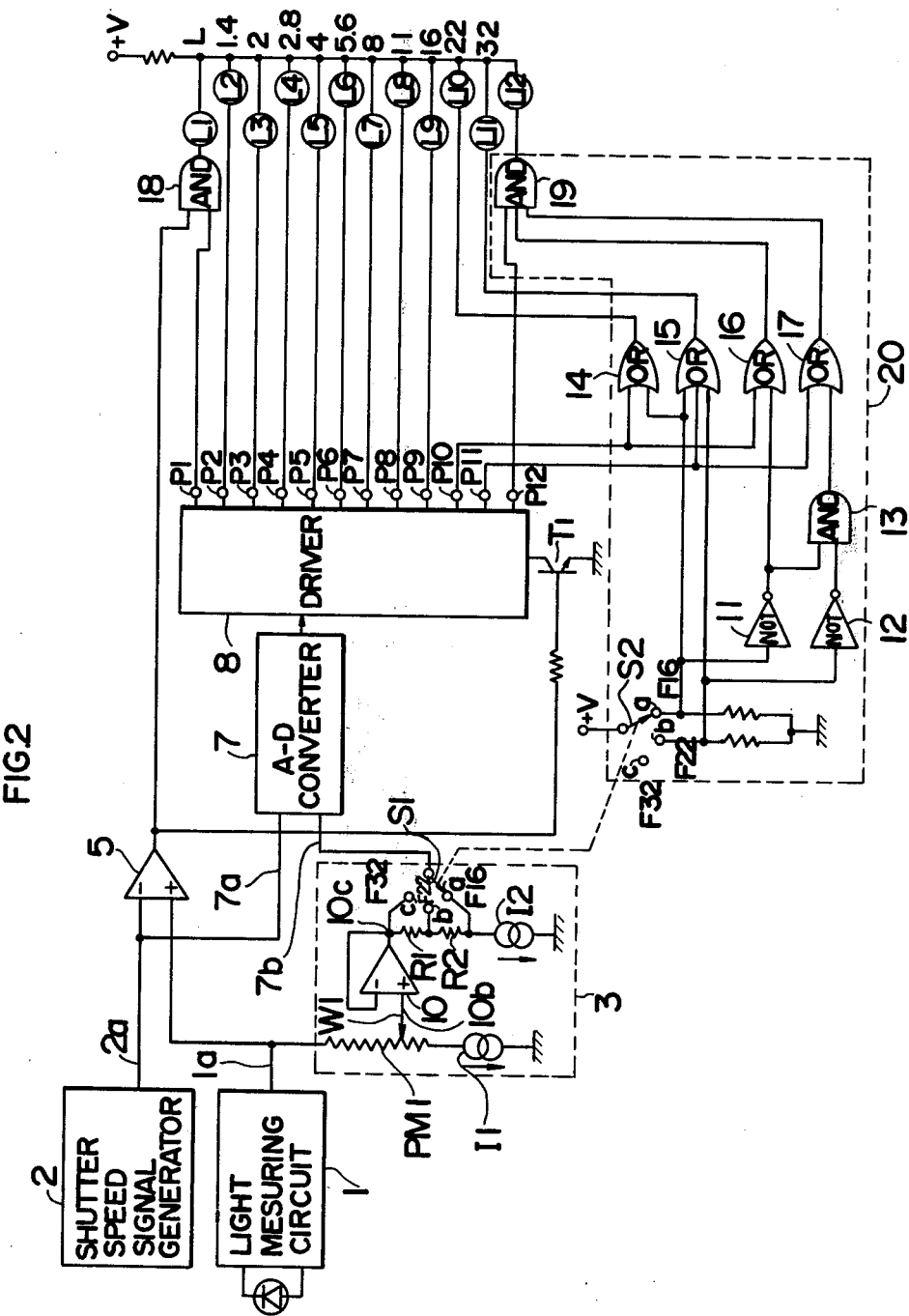
FIG. 2 is a schematic circuit diagram of another embodiment of the present invention.

FIG. 2 shows another embodiment of the present invention applied to a camera for which are provided groups of exchangeable lenses whose minimum diaphragm aperture values may be any one of F16, F22 and F32, and which includes a lens having the full open diaphragm aperture of F1.2. The same reference characters are used for the elements corresponding to the elements in FIG. 1.

Referring to FIG. 2, potentiometer PM1 and constant current circuit I1 connected in series with potentiometer PM1 are an essential part of the level shift circuit 3, with slider W1 producing a voltage signal lower than the output of light measuring circuit 1 by a voltage drop due to the resistor between terminals 1a and W1. The slider W1 is slidable downward from the upper end of potentiometer PM1 by a distance corresponding to the steps from the full open diaphragm aperture to a preset aperture, in accordance with the setting of a diaphragm aperture presetting means of the lens used. Therefore, the voltage signal at the slider W1 corresponds to an exposure time suitable for a preset diaphragm aperture value. Impedance converter circuit 10 generates at its output terminal 10c a voltage signal the same as that of the slider W1 as it is with a low output impedance. Resistors R1 and R2, as well as constant current circuit I2 form another level shift circuit. Resistors R1 and R2 have resistance values for respectively providing a voltage drop corresponding to one step of an exposure adjustment. The above-mentioned two level shift circuits constitute level shift circuit 3 in FIG. 1 to provide information of a full open diaphragm aperture of a lens. In the embodiment of FIG. 2, the detecting operation performed by level shift circuit 4 and comparison circuit 6 in the embodiment of FIG. 1 for detecting whether the required diaphragm aperture is within or outside an available range is carried out by another means described hereinafter.

When the minimum diaphragm aperture is preset by a preset means as described later, switches S1 and S2 are selectively connected to any one of contacts a, b or c for the diaphragm aperture value of F16, F22 or F32. The portion enclosed by dotted line 20 is a circuit adapted to detect whether the required diaphragm aperture is within or outside an available range, as well as to control light emitting diodes L10, L11 and L12 in cooperation with driver 8 such that any one of the light emitting diodes is actuated by a corresponding one of the logic circuits to which a signal bearing information of the minimum aperture provided by switch S2 and a signal from driver 8 are applied. In FIG. 1, there may occur a case where voltage comparison circuit 6 is actuated to light up light emitting diode L12 even when the output of light measuring circuit 1 is within an available diaphragm aperture range, unless the levels to be shifted by level shift circuits 3 and 4 are precisely adjusted. In the circuits of FIG. 2, such a malfunction as mentioned above does not occur.

Figure 3A:
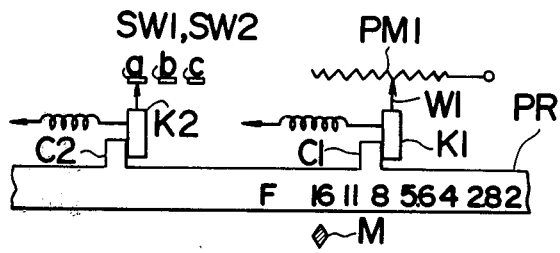
FIGS. 3A-3C is an explantory illustration of diaphragm aperture information transmitting mechanism.
Figure 3B:
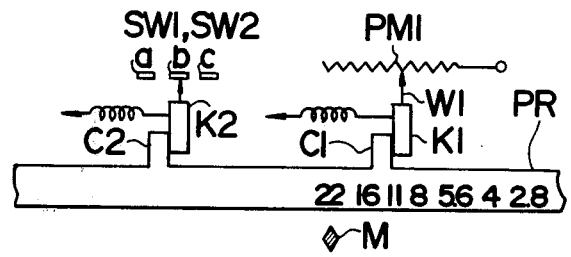
Figure 3C:
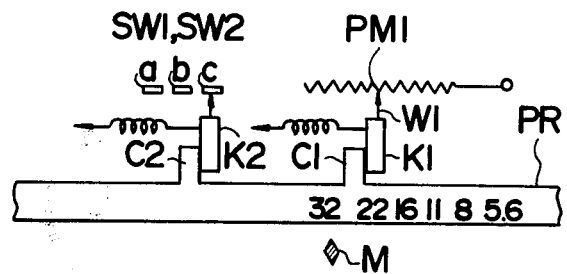

The operation of switches S1 and S2, as well as of slider W1 of potentiometer PM1 are performed when an exchangeable lens is mounted on a camera. The mechanisms for the operation are now explained with reference to FIG. 3. Referring to FIG. 3, diaphragm aperture preset ring PR including engageable lugs C1 and C2 is mounted on a lens barrel. Engageable lugs C1 and C2 are engaged by coupling pins K1 and K2 provided on a camera body. Pin K1 is coupled with slider W1 of potentiometer PM1 while pin K2 is coupled with the movable contact of each of switches S1 and S2. Bringing the minimum diaphragm aperture value on preset ring PR into registeration with mark M on the lens barrel sets slider W1 to a position where the slider W1 has been moved by a distance corresponding to the steps from the lens full open diaphragm aperture to the minimum diaphragm aperture value. As shown in FIGS. 3 (A), (B) and (C), engageable lug C2 is positioned such that a corresponding one of the fixed contacts, a, b and c of switches S1 and S2 may be selected in accordance with the minimum aperture of the lens, which is any one of F16, F22 or F32. According to the preset mechanism constructed as explained above, a voltage produced between output terminal 1a of the light measuring circuit and movable contact terminal 7b of switch S1 in the circuit of FIG. 2, corresponds to the difference of steps between the full open diaphragm aperture to an aperture value of F32, regardless of the minimum diaphragm aperture value. For example, if a lens mounted on the camera has a minimum aperture of F16, contact a of switch S1 is selected.

In this case, as the voltage difference between terminal 1a and point 10c, at which point the voltage is the same as that at the slider W1 of potentiometer PM1, corresponds to the steps from the full open diaphragm aperture to the minimum aperture F16, the voltage at terminal 7b is the sum of a voltage for two steps given by two resistors R1 and R2. The voltage between the terminal 1a and the point 10c represents the steps from the full open aperture to F32, as a sum of two steps for the resistors and steps to F16. Therefore, the voltage difference between terminals 1a and 7b may be used as information of a full open diaphragm aperture value, as the number of steps from F32.

Referring again to FIG. 2, a sum of the voltage corresponding to the steps from the full open diaphragm aperture to F32 and the voltage as the difference in output between light measuring circuit 1 and speed signal circuit 2, i.e. the voltage corresponding to the steps to be stopped down from the full open diaphragm aperture for providing a suitable exposure for a set shutter speed is applied across input terminals 7a and 7b of AD converter circuit 7 the output of which is decoded in driver 8 to produce a signal output at one of output terminals P1 through P12. It is to be noted that AD converter circuit 7 is constructed such that it enables simultaneous outputs at two adjacent output terminals Pi and Pi+1 to light up two lamps at the same time for the indication of an intermediate diaphragm aperture value between the adjacent values.

Now, consideration is given to a case where a lens having a full open aperture of F2 and a minimum aperture of F16 is associated with the indicating device of FIG. 2. When the shutter speed is set at 1/500 second, and the output of light measuring circuit 1 corresponds to 1/250 seconds, the voltage at terminals 7b corresponds to the aperture value eight steps (six steps from F2 to F16 and two steps from F16 to F32 makes eight steps) down from the voltage corresponding to 1/250 second. Hence, the difference from the output of speed signal circuit 2 corresponding to 1/500 second is nine steps. Driver 8 receives a signal corresponding to the nine steps, from AD converter circuit 7 and produces an output at output terminal P2 to light up lamp L2 for F1.4 i.e. the aperture nine steps up from F32. However, since the output of speed signal circuit 2 is higher than that of light measuring circuit 1 with respect to comparison circuit 5, output of which is at low level, transistor T1 is turned off, actually disabling the output at terminal P2, thereby causing lamp L2 to remain unlit. Instead, the output at AND gate 18 is at a low level, so that lamp L1 lights to warn that an aperture to be controlled is not within the available full open aperture range.

Next, consideration, is give to a case where the output of light measuring circuit 1 corresponds to 1/4000 second with the shutter speed set at 1/30 second for the same lens. The voltage at terminal 7a at this time corresponds to 1/15 second, i.e. eight steps down from the output corresponding to 1/4000 second and differs from the output of speed signal circuit 2 by an amount corresponds to one step. Therefore, AD converter 7 controls driver 8 in accordance with the input signals, at the terminals 7a and 7b, and driver 8 is to produce at output terminal P10 a signal to light lamp L10 for F22 one step up from F32 (in practice the output terminal P10 is at a low level). This low level signal is transmitted through OR circuit 14 to lamp L10. However, since switch S2 is connected to contact a and another input terminal of OR circuit 14 is applied with a voltage of +V through switch S2 to make the output of OR circuit 14 high, no current flows to lamp L10. Actually, in this case, the lens minimum diaphragm aperture is F16 and F22 is not within the available diaphragm aperture range. However, OR circuit 16 is applied with a low level signal at contact a of switch S2 being inverted by inverter 11 as well as with a low level signal at output terminal P10 of driver 8. Thus, the output of OR circuit 16 is at a low level. This low level output is applied to AND gate 19, output of which becomes a low level, allowing lamp L12 to light, thereby warning that a diaphragm aperture is not within the available aperture range on the side of the minimum aperture.

Similarly, when a suitable diaphragm aperture is F32, a signal appears at output terminal P12 of driver 8 (in practice the terminal P12 becomes a low level), but a high level signal is transmitted from contact a of switch S2 via OR circuit 15 to lamp L11 which does not light. As the output terminal of OR circuit 17 is at a low level, the output of AND gate 19 is also at a low level. Thus lamp L12 lights to give warning that a diaphragm aperture is outside the available aperture range.

When a suitable diaphragm aperture is within the available aperture range, one of output terminals of driver 8 that is connected to lamp Li (i is one of 2 through 11) corresponding to the suitable aperture value becomes a low level to light up that lamp. The other output terminals of driver 8 remain at a high level so long as transistor T1 is ON. In this case, the two inputs of AND gate 18 are both at a high level, and the output of AND gate 18 is also at a high level, causing lamp L1 to remain unlit. As for lamp L12, since three inputs of AND gate 19 are all applied with signals of high level from the terminals P10 and P11 through OR circuits 16 and 17, as well as from the terminal P12 of driver 8 directly, the output of AND gate 19 becomes a high level, so that the lamp L12 does not light.

When a diaphragm aperture is not within the available aperture range on the side of full open aperture and lamp L1 lights, lamp L12 does not light. This is because transistor T1 at this time is turned off and all the output terminals of driver 8 become a high level, so that the three inputs of AND gate 19 are at a high level, causing lamp L12 to remain unlit. Conversely, when lamp L12 lights, the output of comparison circuit 5 is at a high level and terminal P1 of driver 8 is also at a high level. Thus, the output of AND gate 18 becomes a high level, causing lamp L1 to remain unlit.

The preferred embodiment described here relates to a camera adapted for use with an exchangeable lens including one having the full open diaphragm aperture of F1.2. The diaphragm indicating operation of this camera is now explained. Under a situation that a suitable diaphragm aperture is F1.2, output terminals P2 and P1 of driver 8, the former terminal corresponding to F1.4, both are at a low level (as described earlier, when a diaphragm aperture value to be indicated is an intermediate value, driver 8 produces a signal at each of the two output terminals corresponding to the aperture values close to and at both sides of the intermediate that value, i.e. makes the terminals at a low level). This causes lamps L1 and L2 to light at the same time, thereby indicating that a diaphragm aperture is an F value a half step smaller than F1.4, i.e. F1.2. When a diaphragm aperture is out of that available on the side of full open aperture range, the output of comparison circuit 5 will be at a low level, turn off transistor T1 with all the output terminals of driver 8 being made a high level, whereby the output of AND gate 18 becomes a low level, resulting in lamp L1 alone lighting.

Figure 4:
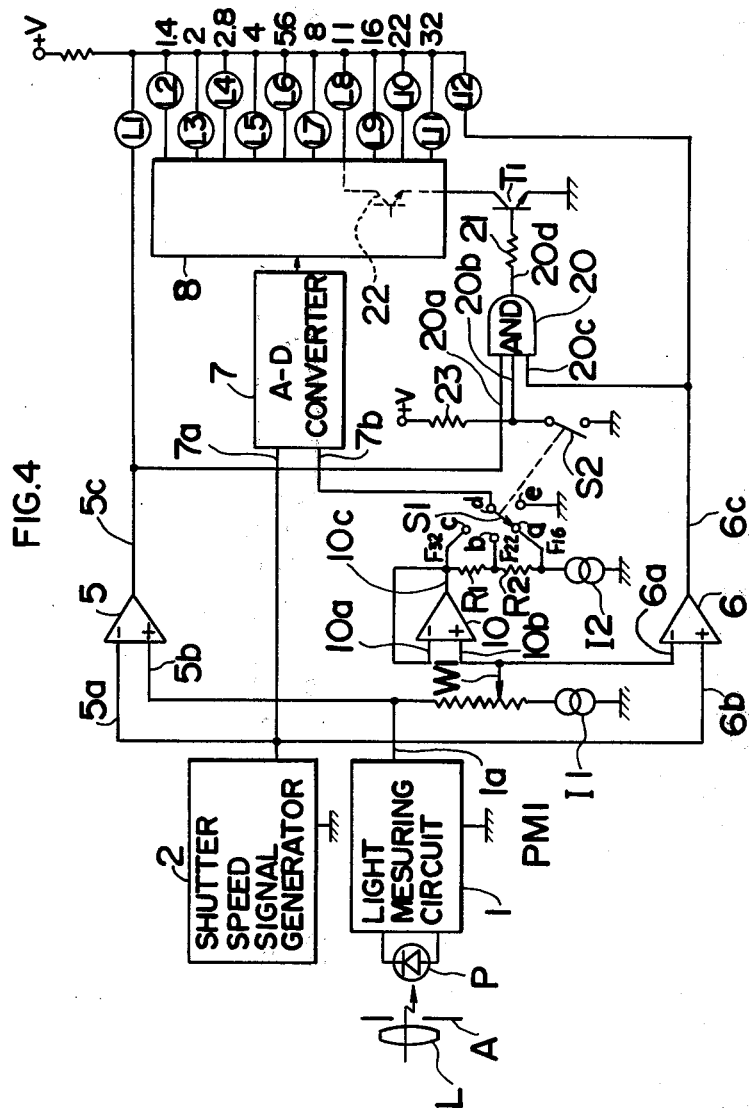
FIG. 4 is a schematic circuit diagram of still another embodiment of the present invention.

FIG. 4 shows a circuit of a modified embodiment according to the present invention. Referring to FIG. 4, light measuring circuit 1 includes photocell P receiving scene light through camera objective L and diaphragm aperture A and adapted to generate a voltage signal proportional to the logarithm of the scene brightness measured by the photocell. The light measuring circuit may include an electric calculation circuit for carrying out calculations in accordance with the APEX system with a signal comensurate with film sensitivity used by a camera as well as the signal representative of the scene brightness measured to thereby provide a voltage signal output representative of an exposure time suitable for the scene brightness set exposure factors, such as the film sensitivity, and full open diaphragm aperture value. It is to be noted that light measuring circuit 1 is constructed such that its output voltage signal has a linear relationship with time value Tv according to the APEX system and its level rises as time value Tv increases. Speed signal circuit 2 generates a voltage signal commensurate with a shutter speed selected by a photographer, and is constructed such that the voltage signal generated thereby may be equivalent to the voltage signal of light measuring circuit 1, i.e. the same voltage being generated for the same shutter speed value. Potentiometer PM1 connected between output terminal 1a of light measuring circuit 1 and constant current circuit I1 constitutes a possible diaphragm step information setting circuit together with constant current circuit I1, with sliding element W1 of potentiometer Pm1 being interlocked with a first signal transmitting member fixed on the aperture preset ring of an exchangeable lens in the form of a lug, so that the element W1 may slide a distance depending on the steps from the full open diaphragm aperture to the preset diaphragm aperture, and that a signal representative of an exposure time suitable for a set diaphragm aperture value may be set by sliding element W1. Potentiometer PM1 has a linear characteristic, and the voltage drop produced between terminal 1a and sliding element W1 is proportional to the steps of the diaphragm aperture stopped-down to the preset value. Impedance converter circuit 10 having one input terminal 10b connected to sliding element W1 constitutes an impedance reducing circuit, with another input terminal 10a being connected to output terminal 10c which generates an output with a low output impedance, a voltage of the same level as that of input terminal 10b. Resistors R1 and R2, as well as constant current circuit I2 connected in series between output terminal 10c of impedance converter circuit 10 and ground level constitute a level shift circuit. At contacts b and c of changeover switch S1 are produced respectively voltage signals of the levels respectively lower than that of terminal 10c due to voltage drops by resistors R1 and R2 and R1 alone. The voltage drop by any one of resistors R1 and R2 is set so that it may be equal to a change for one step of the output voltage of light measuring circuit 1. It may be apparent here that the resistances of resistors R1 and R2 are equal to one another. Switch S1 is interlocked with a second signal transmitting member fixed on the diaphragm aperture preset ring of an exchangeable lens in the form of a lug, as explained later.

Contacts a, b and c of switch S1 are selectively connected to common terminal d in accordance with minimum diaphragm aperture values of exchangeable lens of F16, F22 and F32 when their aperture preset rings are set at their minimum diaphragm aperture value, as shown in FIGS. 6 (B), (C) and (D). The diaphragm aperture preset member of the exchangeable lenses having the second signal transmitting member is set at any aperture value other than the minimum diaphragm aperture values, or when an exchangeable lens having no second signal member is associated with the device of FIG. 4, common terminal d of switch S1 is connected to contact e.

Switch S2 interlocked with switch S1 to be closed with switch S1 connected to contact c and opened with switch S1 being connected to any other contacts. Comparison circuits or operational amplifiers 5 and 6 are used for voltage comparison to detect if a suitable diaphragm aperture to be controlled is within an available diaphragm aperture range or not. Output terminals 5c and 6c become a high level when the output level of non-inversion input terminals 5b and 6b is higher than that of inversion input terminals 5a and 6a, and become a low level when the reverse is the case. Input terminals 5b and 5a of comparison circuit 5 are respectively connected with the output terminals of light measuring circuit 1 and speed signal circuit 2. Input terminals 6b and 6a of comparison circuit 6 are respectively connected to the output terminal of speed signal circuit 2 and sliding element W1 of potentiometer PM1. Further, output terminal 5c of comparison circuit 5 is connected to indicating means L1 adapted for warning that a diaphragm aperture to be controlled is outside an available aperture range on the side of full open aperture, i.e. that a set shutter speed is too slow for the scene brightness measured and available aperture range, as well as to input terminal 20a of AND circuit 20. Output terminal 6c of comparison circuit 6 is connected to indicating means L12 for warning that a diaphragm aperture to be controlled is outside an available aperture range on the side of minimum aperture, i.e. that a set shutter speed is too fast for the scene brightness measured and the available diaphram aperture range, as well as to input terminal 20c of AND circuit 20.

Block 7 is an AD converter which converts an analog signal in the form of voltage between input terminals 7a and 7b into a digital signal, which is provided to drive any one of indicator lamps L2 through L11 to light it as a function of the analog signal. As the AD converter 7, a converter of the type constructed such that two adjacent indicating members are lit to enable an indication of an intermediate value, as proposed, for example, in Japanese Laid-Open-Patent No. 49-91641, may be used. Transistor T1 having its collector connected to driver 8 and its base connected to output terminal 20d of AND circuit 20 via resistor 21 is turned ON, when the output level of AND circuit 20 is "high", to actuate driver 8, thereby enabling lighting of lamps L2 through L11. Conversely, when transistor T1 is turned off, any one of lamps L2 through L11 does not light even when a signal for lighting the lamp is output from AD converter 7. Transistor 22 having its collector connected to lamp L8 and emitter connected to the collector of transistor T1, as shown by the dotted line, indicates a part of driver 8. When the base of transistor 22 is forward biased by an output signal from AD converter 7, lamp L8 lights if transistor T1 is turned on. In the diagram, only one transistor 22 connected to lamp L8 is shown, but it is to be understood that similar transistors are connected to the other lamps in parallel with each other. In this case, the collector of each transistor is connected to each lamp, and all the emitters of the transistor are connected to the connector of transistor T1. Light emitting diodes or liquid quartz display devices are used for lamps L1 through L12 and arranged in a row in the view finder, with graduations of diaphragm aperture values (1.4, 2, 2.8–22. 32) being arranged beside respective lamps.

Figure 5:
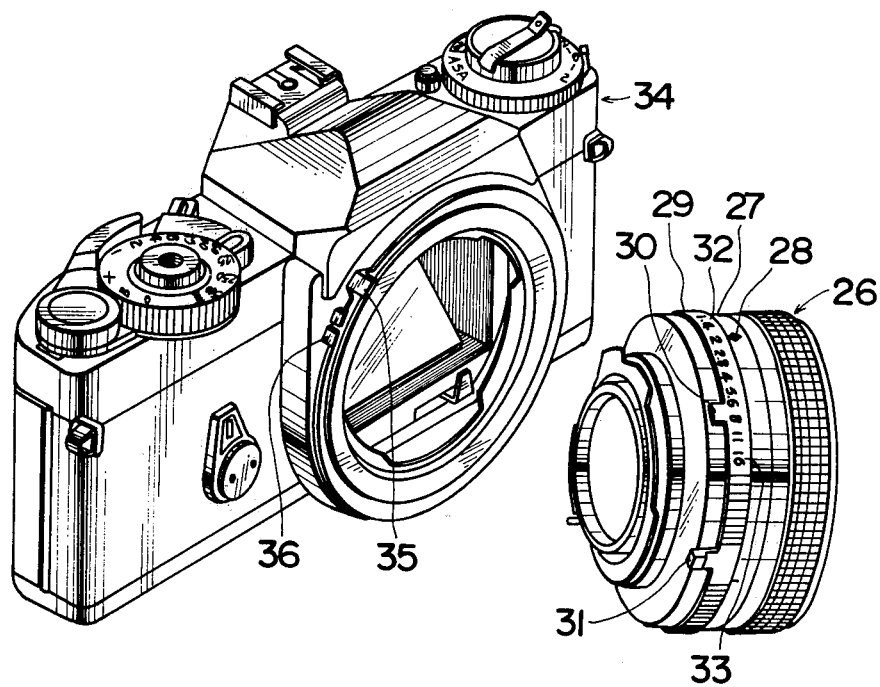
FIG. 5 is a perspective view of a camera and an interchangeable lens for which the present invention can be applied.

FIG. 5 is a perspective view of an exchangeable lens having the first and second signal transmitting members on its diaphragm aperture preset ring corresponding to the above mentioned aperture preset means, as well as of a camera body to be coupled with the exchangeable lens. Referring to FIG. 5, fixed index 28 corresponding to M in FIG. 3 is provided on fixed ring 27 of exchangeable lens generally denoted by 26. If diaphragm aperture present ring 29 is rotated about the optical axis of the lens to bring any desired one of the graduations into registration with fixed index 28, then a diaphragm aperture value is preset. Lug 30 integrally fixed on diaphragm aperture preset ring 29 serves as the first signal member corresponding to C1 in FIG. 3. Lug 30 engages pin 35 (corresponding to K1 in FIG. 3) arranged on camera body 34 to be rotated clockwise when diaphragm aperture preset ring 29 is operated from the full open diaphragm aperture to the minimum diaphragm aperture position. Furthermore, lug 31 integrally fixed on diaphragm aperture preset ring 29 serves as the second signal member corresponding to C2 in FIG. 3 and is engageable with pin 36 (corresponding to K2 in FIG. 3) on camera body 34 when diaphragm aperture preset ring 29 is set to minimum diaphragm aperture value 33. Such engagement is illustrated in FIG. 6.

The operation for diaphragm aperture and warning indications is now explained by referring to the circuit in FIG. 4. Description is first made of a case where diaphragm aperture preset ring 29 having first and second signal members 30 and 31 is set as shown in FIG. 6 (B). The difference in output between light measuring circuit 1 and speed signal circuit 2 corresponds to a difference of shutter speed steps between a shutter speed suitable for a full open diaphragm aperture and a set shutter speed. This is also a signal representative of the steps by which the diaphragm aperture should be stopped-down from the full open diaphragm aperture for providing suitable exposure for a set shutter speed and the scene brightness measured. Therefore, if a signal commensurate with a full open diaphragm aperture value is added to this step representative signal, a signal indicating a diaphragm aperture value for a diaphragm aperture stopped down, from the full open diaphragm aperture, by the steps corresponding to the step representative signal may be obtained. In the present embodiment the diaphragm aperture value F32 is selected as a reference diaphragm aperture value, and the difference of steps between the aperture value F32 and full open diaphragm aperture value is used for indicating a lens full open diaphragm aperture. For example, the differences in steps between the lens diaphragm aperture value F32 and each of the full open diaphragm aperture values, F1.4, F2 and F2.8 are 9, 8 and 7 respectively.

Slider element W1 of potentiometer PM1 is slidable in accordance with movement of the first signal member of diaphragm aperture preset ring 29, for a distance corresponding to the difference in steps between the full open diaphragm aperture and the minimum diaphragm aperture (seven steps in case of FIG. 6 (B)), while input terminal 7b of AD converter 7 is reduced in voltage by a level corresponding to nine steps commensurate with the above-mentioned full open diaphragm aperture value of F1.4, from the voltage at output terminal 1a of light measuring circuit 1, because contact a of switch S1 is selected by the second signal member. Now, suppose the output of light measuring circuit 1 equals that of speed signal circuit 2. Since this means that a suitable diaphragm aperture for a set shutter speed is a full open diaphragm aperture, lamp L2 indicating F1.4 may only have to be lit. Thus, AD converter 7 is constructed such that it produces digital signals to light lamp L2 when a voltage corresponding to nine steps is applied between terminals 7a and 7b of AD converter 7, to light lamp L3 for eight steps, and substantially the same function will be followed until lamp L11 is lit for 0 step, respectively. It is possible as the case may be, that a signal corresponding to a diaphragm aperture value smaller than the minimum diaphragm aperture value of F16 now in use may be applied to AD converter 7 depending on the set shutter speed and scene brightness. However, because such a smaller diaphragm aperture is actually impossible, it is not desirable for the aperture value to be indicated as it is. A problem of an actually impossible diaphragm aperture may also occur on the side of the full open diaphragm aperture. For example, there may be a case where a suitable diaphragm aperture is F2 or F1.4 for an exchangeable lens having full open aperture value of F2.8. The condition under which a diaphragm aperture to be controlled goes beyond the available aperture range may be detected by comparison circuits 5 and 6, for the warning by lighting lamps L1 and L12. When a diaphragm aperture required for a set shutter speed is larger than the full open diaphragm aperture of an exchangeable lens, i.e. when a set shutter speed is too slow for an available diaphragm range, the output of speed signal circuit 2 for the set shutter speed is higher in level than that of light measuring circuit 1 which generates a signal indicative of a shutter speed suitable for a full open diaphragm aperture value. This results in the low level of output voltage of comparison circuit 5, thereby warning with lamp L1 to indicate that a diaphragm aperture is not within the available aperture range. At the same time, the "low" level voltage is applied to input terminal 20a of AND circuit 20 to turn off transistor T1 to thereby prohibit indication operation of a diaphragm aperture value with lamps L2 through L11. When a required diaphragm aperture for a set shutter speed diaphragm aperture is smaller than the minimum diaphragm aperture of an exchangeable lens used, i.e. when the set shutter speed is too fast for the available diaphragm range, the output of speed signal circuit 2 is lower in level than a voltage signal at sliding element W1 of potentiometer PM1, which signal corresponds to a shutter speed suitable for a preset diaphragm aperture value. This results in low level of the output of comparison circuit 6, to energize lamp L12 and turn off transistor T1 for prohibiting indication operation. Thus, when an exchangeable lens having the first and second signal members is associated with the present indication device, diaphragm aperture indication for a set shutter speed and warning of diaphragm aperture out of the available aperture range are performed. Furthermore, when exchangeable lenses whose minimum diaphragm aperture values are F22 and F32 are used, contacts b and c of switch S1 are selected, respectively, as shown in FIGS. 6(C) and (D), with indication operation substantially the same as that described above with respect to the case of contact a being performed.

Figure 6A:
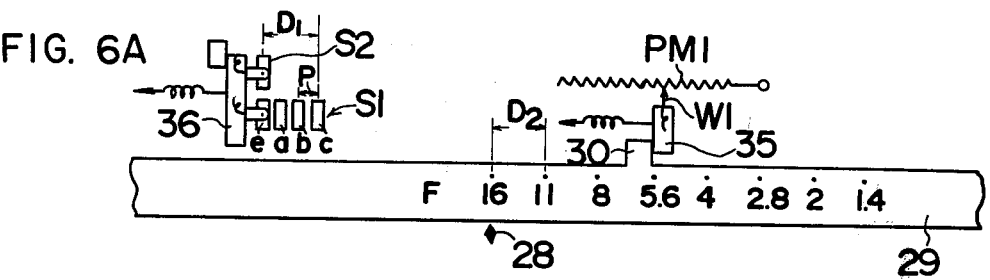
FIGS. 6A-6D is an explanatory illustration of another diaphragm aperture information transmitting mechanism.
Figure 6B:
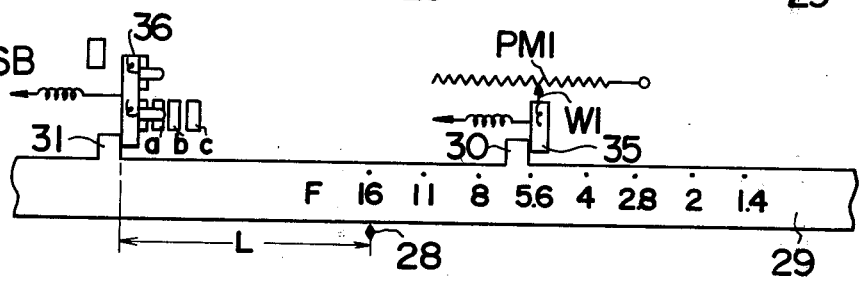
Figure 6C:
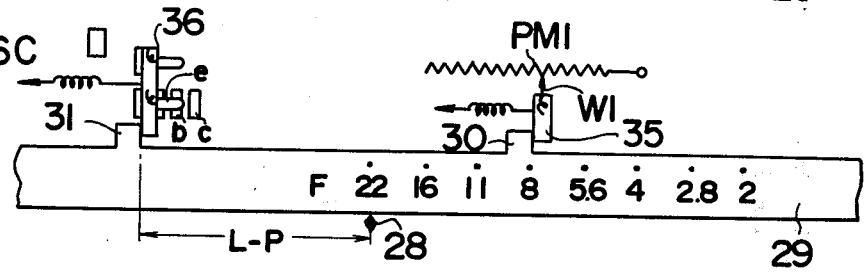
Figure 6D:
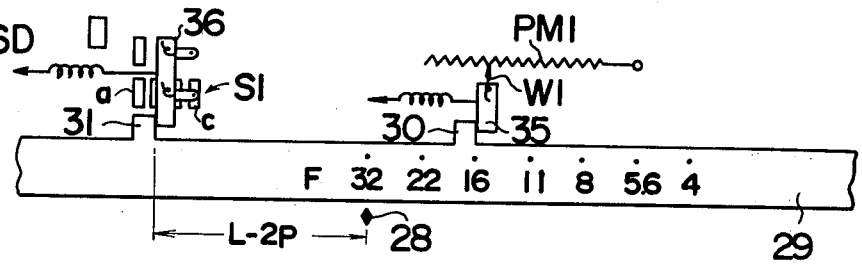

The following description is of a case where diaphragm aperture preset ring 29 of an exchangeable lens having second signal member 31 is set at any diaphragm aperture value other than the minimum diaphragm aperture value, or an exchangeable lens having no second signal member 31 is associated with the device of FIG. 4. As shown in FIG. 6 (A), distance D1 between contacts e and c for switch S1 is arranged to be equal to distance D2 per a single step of a diaphragm aperture preset ring 29, and pitch P between each adjacent contacts also equals ⅓ of distance D2. However, second signal member 31 fixed on diaphragm aperture preset ring 29 is formed at such a position so that the distances from the second signal member to the respective minimum diaphragm aperture scale positions may be L-P and L-2P for the lenses whose minimum diaphragm aperture values are F22 and F32, with the assumption that the distance from the scale position of diaphragm aperture value F16 to second signal member 31 is L for the lens whose minimum diaphragm aperture value is F16. (see FIGS. 6 (C) and 6 (D)). Thus, when a diaphragm aperture is set at any value other than the minimum diaphragm paerture value, e.g. when in exchangeable lenses whose minimum diaphragm aperture values are F16, F22 and F32, the respective values of F11, F16 and F22 are preset, pin 36 assumes a position substantially the same as in the case where an exchangeable lens has no second signal member as shown in FIG. 6(A). Moreover a case may occur wherein an intermediate diaphragm aperture value between F22 and F32 is preset and common terminal d of switch S1 may be connected to contact a or contact b positioned between contact e and c. To prevent such an erroneous setting, the click stop for an intermediate value position may be omitted.

Thus, when an exchangeable lens has no second signal member, or when a diaphragm aperture of an exchangeable lens having second signal member 31 is preset at any value other than the minimum diaphragm aperture value, coupling pin 36 on a camera body is positioned as indicated in FIG. 6(A), thereby closing switch S2 in the circuit of FIG. 4. This causes a "low" level voltage to be input to terminal 20b and AND circuit 20, and output terminal 20d becomes "low" level in response to the low voltage to thereby turn off transistor T1. Accordingly, lamps L2 through L11 connected to driver 8 are supplied with no current, disabling diaphragm aperture indication by the lamps. However, this indication prohibiting operation remains unrelated to indication operation with lamps L1 and L12 for warning that a diaphragm aperture is outside the available aperture range, so that the warning operation is carried out without any hindrance.

It is to be understood that in the above embodiment, one of a plurarity of indicating elements forming a row is lit to indicate a diaphragm aperture. However, the present invention may be applicable to another construction adapted to indicate diaphragm aperture values by 7 segments of digital indicating elements.

While the described embodiment represents the preferred form of the present invention, it is to be understood that modifications will occure to those skilled in that art without departing from the spirit of the invention. The scope of the invention is therefore to be determined solely by the appended claims.

What is claimed is:

1. A diaphragm aperture indicating system for a camera to be coupled with an interchangeable lens having a diaphragm aperture range, said system comprising:
means for indicating a diaphragm aperture suitable for a measured scene brightness and a set shutter speed;
first and second indication members;
a first actuating means for generating an output to actuate said first indication member when the suitable diaphragm aperture exceeds one of the limits of the available diaphragm aperture range, a second actuating means for generating an output to actuate said second indication member when the suitable diaphragm aperture exceeds the other limit of the available diaphragm aperture range; and means responsive to the outputs of said first and second actuating means for preventing diaphragm aperture indication when either of said first and second actuating means generates an output.

2. A diaphragm aperture indication system for a camera to be coupled with an interchangeable lens having a diaphragm aperture range extending from a full open to a minimum diaphragm aperture, said system comprising:

means for measuring a scene brightness;

a first means for generating a first signal commensurate with a set shutter speed;

a second means for generating a second signal representative of a shutter speed suitable for the scene brightness measured by said means for measuring with the full open aperture of said interchangeable lens;

a third means associated with said second means for generating a third signal having a level obtainable by shifting the level of said second signal by an amount corresponding to the number of steps from the full open to the minimum diaphragm aperture of the interchangeable lens;

a first comparison means for comparing said first and second signals to generate an output when the shutter speed corresponding to the second signal is lower than that corresponding to the first signal;

a second comparison circuit for comparing said first and third signals to generate an output when the shutter speed corresponding to said third signal is higher than that corresponding to said first signal;

a diaphragm indication means for indicating a diaphragm aperture suitable for the set shutter speed and measured scene light;

a first out-of-range indicating means responsive to the output of said first comparison means;

a second out-of-range indicating means responsive to the output of said second comparison circuit; and means for deactuating said diaphragm indication means when either of said first or second comparison means generates an output.

3. A diaphragm aperture indicating system as claimed in claim 2 wherein said means for measuring scene brightness includes a photocell arranged to receive scene light through the full open diaphragm aperture.

4. A diaphragm aperture indicating means as claimed in claim 3 further comprising fourth means for generating a fourth signal having a level obtained by shifting the level of said second signal by the amount commensurate with said full open diaphragm aperture, and wherein said diaphragm aperture indication means is responsive to said first and fourth signals.

5. A diaphragm aperture indicating means as claimed in claim 3 further comprising fourth means associated with said third means and said second signal receiving member for generating a fourth signal having a level obtained by shifting the level of said second signal by an amount commensurate with said full open diaphragm aperture, and wherein said diaphragm indication means is responsive to said first and fourth signals.

6. A diaphragm aperture indicating system as claimed in claim 5 further comprising a switch member associated with said second signal receiving member to be operated when said diaphragm setting member is set to the minimum aperture position, and wherein said means for deactuating is associated with said switch member for deactuating said diaphragm indication means also when said switch member is not operated.

7. A diaphragm aperture indicating system for a camera comprising;

an interchangeable lens including a diaphragm setting member, a diaphragm means having an aperture controllable to a desired value between full open and minimum apertures, a first signal transmitting member for transmitting a signal commensurate with the number of steps from the full open to a selected aperture, and a second signal transmitting member for transmitting a signal commensurate with the minimum diaphragm aperture;

a first signal receiving member for receiving the signal from said first signal transmitting member as a function of the position of said diaphragm setting member;

a second signal receiving member for receiving the signal from said second signal transmitting member when said diaphragm setting member is set at the minimum diaphragm aperture position;

means for measuring scene brightness through said diaphragm aperture, said diaphragm aperture being fully open while the diaphragm aperture indication is being effected;

a first means for generating a first signal commensurate with a set shutter speed;

a second means for generating a second signal representative of a shutter speed suitable for the scene brightness measured by said means for measuring;

a third means associated with said second means and said first signal receiving member for generating a third signal having a level obtainable by shifting the level of said second signal by an amount corresponding to the number of steps from the full open to the minimum diaphragm aperture of the interchangeable lens with the diaphragm setting member being set to the minimum diaphragm position;

a first comparison means for comparing said first and second signals to generate an output when the shutter speed corresponding to the second signal is lower than that corresponding to the first signal;

a second comparison circuit for comparing said first and third signals to generate an output when the shutter speed corresponding to said third signal is higher than that corresponding to said first signal;

a diaphragm indication means for indicating a diaphragm aperture suitable for the set shutter speed and measured scene light;

a first out-of-range indicating means responsive to the output of said first comparison means;

a second out-of-range indicating means responsive to the output of said second comparison circuit; and means for deactuating said diaphragm indication means when either of said first and second comparison means generates an output.

8. A diaphragm aperture indicating system for a camera comprising:

an interchangeable lens including a diaphragm setting member, diaphragm means having an aperture controllable to a desired value between full open and minimum apertures;

a first diaphragm signal means for providing a signal commensurate with the full open aperture;

a second diaphragm signal means for providing a signal commensurate with the minimum aperture;

means for measuring scene brightness through said diaphragm aperture, said diaphragm aperture being fully open while the diaphragm aperture indication is being effected;

a first means for generating a first signal commensurate with a set shutter speed;

a second means for generating a second signal representative of a shutter speed suitable for the scene brightness measured by said means for measuring;

a third means associated with said second means and said first diaphragm signal means for generating a third signal having a level obtainable by shifting the level of said second signal by an amount corresponding to the full open aperture value of the interchangeable lens;

a comparison means for comparing said first and second signals to generate a first warning signal when the shutter speed corresponding to said second is lower than that corresponding to said first signal;

a fourth means associated with said first and third means for generating an output representative of the aperture value suitable for the measured scene brightness and the set shutter speed;

a second comparison means associated with said fourth means and said second diaphragm signal means for generating a second warning signal when the aperture value suitable for the measured scene brightness and the shutter speed is outside the minimum diaphragm aperture;

a diaphragm indication means associated with said fourth means for indicating the diaphragm aperture corresponding to the output thereof;

a warning indication means actuatable in response to said first and second warning signals; and a fifth means for preventing said diaphragm indication means from the normal indicating operation thereof when either the first or second warning signal is generated.

9. A diaphragm aperture indicating system as claimed in claim 8, wherein said first diaphragm signal means includes a step signal means for providing a step signal commensurate with the number of steps from the full open to a selected aperture, and means for combining said step signal with said signal commensurate with the minimum aperture to provide said signal commensurate with the full open aperture.

10. A diaphragm aperture indicating system as claimed in claim 8, wherein said second diaphragm means includes means for providing a first step signal commensurate with the number of steps from a given aperture value to the minimum aperture value when said diaphragm setting member is set to the minimum aperture position, and said first diaphragm signal means includes means for providing a second step signal commensurate with the number of steps from the full open to a selected aperture, and means for combining said first and second step signals to provide the signal commensurate with the full open aperture when said diaphragm setting member is set to the minimum aperture position.

* * * * *